United States Patent [19]
Martini

[11] Patent Number: 5,737,577
[45] Date of Patent: Apr. 7, 1998

[54] COMPLEMENTARY BLOCK STORAGE FOR BREATER MINIMUMDATA TRANSFER RATE

[75] Inventor: Edward W. Martini, Newark, Calif.

[73] Assignee: Digital Video Systems, Inc., Santa Clara, Calif.

[21] Appl. No.: 694,399

[22] Filed: Aug. 12, 1996

[51] Int. Cl.$^6$ .................................................. G06F 12/00
[52] U.S. Cl. ................ 395/497.04; 395/488; 395/441; 395/440; 364/DIG. 1
[58] Field of Search .................................. 395/488, 440, 395/441, 851, 497.04; 386/125

[56] References Cited

U.S. PATENT DOCUMENTS

| | | | |
|---|---|---|---|
| 4,604,687 | 8/1986 | Abbott | 395/616 |
| 5,510,905 | 4/1996 | Birk | 386/125 |
| 5,557,770 | 9/1996 | Bhide et al. | 395/488 |
| 5,581,724 | 12/1996 | Belsan et al. | 395/441 |
| 5,586,264 | 12/1996 | Belknap et al. | |
| 5,588,129 | 12/1996 | Ballard | 395/440 |
| 5,590,381 | 12/1996 | Mourad | |
| 5,594,924 | 1/1997 | Ottesen et al. | 395/851 |

Primary Examiner—Tod R. Swann
Assistant Examiner—David Langjahr
Attorney, Agent, or Firm—Sawyer & Associates

[57] ABSTRACT

A method and system for storage and delivery of a plurality of data files is disclosed. The method and system include dividing at least one data file of the plurality of data files into a plurality of data blocks. The method and system further include storing the at least one data file by storing the plurality of data blocks in a plurality of disks, allowing a user to select any data file of the plurality of data files for delivery, and transferring the selected data file from the plurality of disks. Each disk includes a plurality of blocks having a disk block size. Storing the at least one data file includes storing a data block of the plurality of data blocks in a next available block of one disk, determining a complementary block on a next disk, storing a next data block in the complementary block on the next disk, and repeating the prior two steps for each of the plurality of disks until the at least one data file is stored. Transferring the selected data file further includes performing a seek operation on one disk to find a next block on the one disk while a read and data transfer is performed for a current block on another disk.

23 Claims, 3 Drawing Sheets

COMPLEMENTARY BLOCK STORAGE FOR BREATER MINIMUMDATA TRANSFER RATE

CROSS-REFERENCE TO RELATED APPLICATIONS

The present application is related to U.S. patent application Ser. No. 08/700,614, entitled BLOCK SIZING FOR MULTIPLE USER CONTINUOUS MEDIA DATA SYSTEM, filed Aug. 12, 1996, now abandoned, which provides a larger disk block size, and U.S. patent application Ser. No. 08/694,432 entitled DATA STRIPING FOR INCREASED BUS UTILIZATION, filed Aug. 12, 1996, which allows data to be transferred from two disks rapidly across a bus.

FIELD OF THE INVENTION

The present invention relates to a method and system for continuous media computer systems and more particularly to a method and system for increasing the minimum data transfer rate for a computer system.

BACKGROUND OF THE INVENTION

Conventional computer data streams are usually accessed randomly. In such a file system, a user generally moves from place to place in the file without requiring continuous playback of the entire file. In addition to not being presented all at one time, typical data files are relatively small.

A different type of data is continuous media data. Continuous media data files are used to store and deliver data such as movies or music titles. For continuous media data files, the data stream is delivered in order, rather than in a random fashion chosen by the user. In addition, the data files are typically very long. A karaoke or music video title, for example, is approximately four minutes long and about 40 MB in size.

Typical computer systems store data in blocks. Each block has a data block size. The data block size is the smallest amount of data on a disk that the computer system can access. The location of each block on the disk is marked by a pointer. When a file is accessed, the pointer moves to each block in the correct order.

In conventional disks, data is stored in blocks in tracks running from the outer perimeter of the disk to the inner area of the disk. Because the linear speed of the disk past the head at the outer tracks is greater than at the inner tracks, the data transfer rate at the outer tracks is usually higher than the transfer rate in the inner tracks. For example, some conventional disks have a transfer rate of approximately three megabytes (MB) per second on the inner tracks, and four MB per second on the outer tracks. There are, however, some variations for individual disks. Although older disks may have different rates, the outer track transfer rate is generally larger than that of the inner track.

Continuous media computer systems are employed to provide real time delivery of lengthy continuous media data files. A single computer using conventional architecture may be capable of playing a single continuous media data stream for a single user. However, one computer may not be capable of providing real time delivery of continuous media streams for many different recipients at one time. In general, conventional computer systems may be too slow to access and deliver the blocks comprising the continuous media data file to many users in real time. This difficulty in servicing many users is partially due to the minimum rate at which conventional disks can deliver the data.

A continuous media system which delivers data files to a number of users takes into account the worst case transfer rate when allocating bandwidth for data transfers. Thus, the system may be limited in operation to the slowest transfer rate. The worst case transfer rate occurs when all accesses are made to the same bitstream and that bitstream is located at the inner part of the disk. For example, it is possible that the most frequently accessed file is stored at the inner portions of the disk. Since these are the slowest portions of the disk, the most popular file may be transferred at the lowest rate. For a disk which transfers four MB/sec at the outer tracks and three MB/sec at the inner tracks, this worst case transfer rate is three MB/sec. Consequently, a conventional continuous media system may be limited to the slowest transfer rate of a disk used.

Accordingly, what is needed is a system and method for faster worst case transfer rate from a disk, particularly for multiple users. The present invention addresses such a need.

SUMMARY OF THE INVENTION

The present invention provides a method and system for storage and delivery of a plurality of data files. The system comprises a first disk and a second disk for storing the plurality of data files. The first disk and the second disk each further comprise a plurality of blocks. The system further comprises means coupled to the first and second disks for dividing each of the plurality of data files into at least one data block. At least one of the plurality of data files is divided into a plurality of data blocks having an order. The at least one data file is stored by storing the plurality of data blocks in a portion of the plurality of blocks in order alternatively in the first and second disks. Each data block stored in the second disk is located in a block occupying a complementary location on the second disk to a block on the first disk in which a prior data block in the order is stored. The system further comprises means coupled to the first and second disks for transferring each of the plurality of data files from the first and second disks.

According to the system and method disclosed herein, the present invention increases the minimum rate that data can be transferred from a disk, thereby allowing the system to deliver a larger number of data files to users at one time. Real time delivery of continuous media data files to a number of users is thus made more feasible. Consequently, overall system performance is increased.

DETAILED DESCRIPTION OF THE INVENTION

Figure 1:
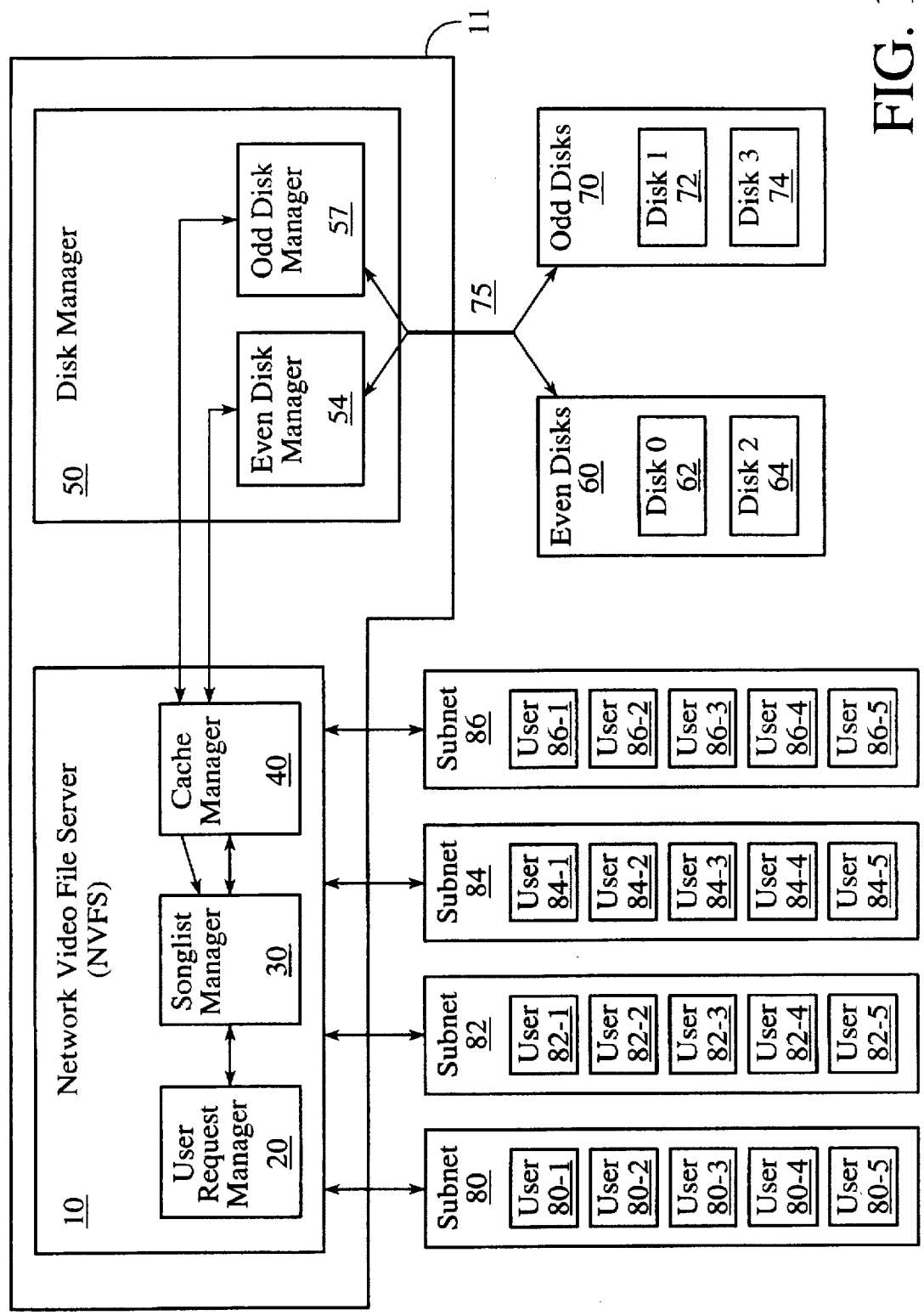
FIG. 1 is a block diagram of one embodiment of a computer system employing the method and system.

The present invention relates to an improvement in continuous media computer systems, particularly those serving multiple users. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Continuous media streams are used to store and deliver data such as movies or music titles. In continuous media streams, the entire data stream is delivered in order. In addition, the data files are typically very long. A karaoke title, for example, is approximately four minutes long and requires approximately 40 MB for storage in a computer.

In typical systems, blocks are located in tracks running from the outer perimeter of the disk to the inner area of the disk. Because the linear speed of the disk past the head at the outer tracks is greater than at the inner tracks, the data transfer rate at the outer tracks is higher than the transfer rate in the inner tracks. For example, some conventional disks have a transfer rate of approximately three megabytes per second on the inner tracks but four MB per second on the outer tracks.

When a file requiring more than one block is stored on the disk, the locations of the blocks holding the data are typically chosen randomly. Although locations of blocks are typically chosen randomly, it is possible for the blocks storing a particular data file to all be located at the inner portion of the disk or at the outer tracks of the disk. When multiple users access the system, this problem is compounded. In a multiple user file system, each user's process is swapped in and acquires rights to the disk subsystem. For each user, the file system seeks and accesses each block of data in the continuous media stream. When many users attempt to access continuous media data, the file system switches between users as well as finds and accesses blocks for each user's continuous media stream. Consequently, the playback of a file located solely in blocks at the inner tracks of the disk may be slower than a file located only in blocks at the outer tracks of the disk.

Continuous media computer systems provide real time delivery of lengthy, continuous media data files. A single computer using conventional architecture may be capable of playing a single continuous media stream for a single user. However, those with ordinary skill in the art will realize that partly because of the low minimum data transfer rate of typical disks, a file system employing conventional architecture may be incapable of serving many users.

A continuous media system which delivers data files to a number of users, such as a network video file server ("NVFS"), must take into account the worst case transfer rate when allocating bandwidth for data transfers. To allocate the bandwidth, the system typically predetermines the maximum number, n, of continuous media files that the system can deliver at one time in the worst case. The system predetermines n so that when user number n+1 requests service, the system knows that the user cannot access the data files. Instead, the user may be notified that the continuous media files cannot be delivered until another user exits the system.

The worst case transfer rate occurs when all accesses are made to the same bitstream and that bitstream is located at the inner tracks of the disk. For example, where a conventional disk transfers data at four MB/second at the outer tracks and three MB/second at the inner tracks, the worst case transfer rate is three MB/second. Thus, the transfer rate for a file stored in blocks at the inner tracks of the disk maybe only three MB/second. When allocating the bandwidth, the system assumes that all files are being transferred at the minimum rate and calculates n accordingly. When multiple users access the system, this problem is compounded. In a multiple user file system, each user's process is swapped in and acquires rights to the disk subsystem. For each user, the file system seeks and accesses each block of data in the continuous media stream. When many users attempt to access continuous media data, the file system switches between users as well as finds and accesses blocks for each user's continuous media stream. Consequently, a conventional continuous media system serving multiple users may be limited by the lowest transfer rate of a disk used.

The present invention provides a method and system for increasing the minimum data transfer rate from disks. Thus, the method and system can aid in providing real time delivery of a continuous media data stream to a number of users. The method and system have particular utility when used in a multiple user file server, where rapid delivery of data to each user is important. The present invention will be described in terms of a file server for twenty users delivering video clips using continuous media data streams. In addition, the method and system will be described in terms of a system having four disks. However, one of ordinary skill in the art will readily recognize that the method and system operate effectively for file servers having a different number of users and a different number of disks, as well as other types of systems.

One embodiment of the method and system store data in complementary blocks on multiple disks. Blocks are complementary when one block is a similar distance away from the first block on the fastest track that the other block is from the last block on the slowest track. When delivering a continuous media file, the disks may have a constant data transfer rate from the complementary blocks. The transfer rate is a combination of the maximum and minimum transfer rates of the pair of disks. This constant data transfer rate may be higher than the minimum transfer rate of an individual disk. Consequently, the file server can allocate a higher bandwidth for data transfers and is capable of serving a larger number of users. The system may, therefore, not be limited in operation by the lowest transfer rate of the particular disks being used.

To more particularly illustrate the method and system in accordance with the present invention, refer now to FIG. 1 depicting a block diagram of one embodiment of a computer system 11 employing the method and system. The embodiment includes a network video file server (NVFS) 10. In the embodiment shown in FIG. 1, the NVFS 10 serves a total of twenty clients on subnets 80, 82, 84, and 86. In the present embodiment, each subnet 80, 82, 84, and 86 serves 5 users. In FIG. 1, the users for subnet 80 are shown as 80-1 through 80-5; the users for subnet 82 are 82-1 through 82-5; the users for subnet 84 are 84-1 through 84-5; and the users for subnet 86 are 86-1 through 86-5. However, nothing prevents the method and system from being utilized with a different number of users or a different number of subnets.

The client request manager 20 manages the requests for data from each user 80-1 through 86-5 to determine user access to the data available through the NVFS 10. Songlist manager 30 determines the titles available for the users 80-1 through 86-5 to access.

The embodiment in FIG. 1 also includes four disks: disk zero 62, disk one 72, disk two 64, and disk three 74. Although the present embodiment utilizes two pairs of disks, nothing in the method and system prevent the use of a different number of pairs of disks. In addition, a preferred embodiment currently utilizes only one pair of disks.

The cache manager 40 determines in which pairs of blocks in disk zero 62, disk one 72, disk two 64, and disk three 74 each continuous media data file is stored. Cache manager 40 also maintains a list of the blocks containing each data file. Disk manager 50 controls disks 62, 64, 73, and 74 using even disk manager 54 and odd disk manager 57. Even disk manager 54 controls disk zero 62 and disk two 64. Similarly, odd disk manager 57 controls disk one 72 and disk three 74.

Figure 2:
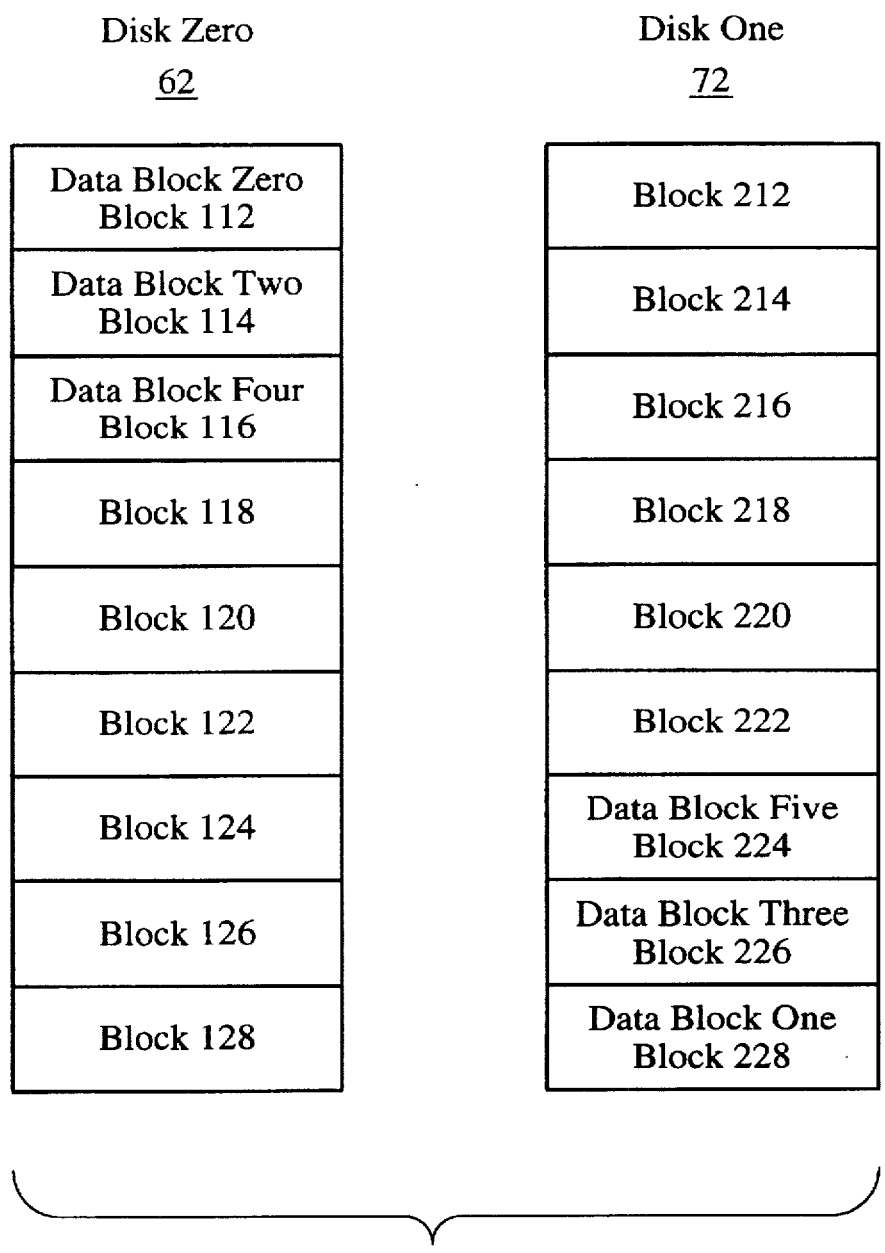
FIG. 2 is a block diagram of one embodiment of the complementary locations of blocks in a pair of disks.

To increase the minimum rate that the disks 62, 64, 72, and 74 deliver a data files, data is stored in complementary blocks in at least two disks. A preferred embodiment uses a single pair of disks, disk zero 62 and disk one 72. FIG. 2 displays a simplified embodiment of how a data file is stored in complementary blocks in two disks.

In the embodiment of FIG. 2, data blocks for a continuous media data file comprised of more than one data block are stored in complementary positions in disk zero 62 and disk one 72. In the embodiment depicted in FIG. 2, for both disks 62 and 72, blocks near the top correspond to blocks at the outer tracks, while blocks near the bottom correspond to blocks near the inner track. Thus, blocks 112 and 212 are at the outer track, while blocks 128 and 228 are at the inner track. In addition, although disks 62 and 72 are depicted with only nine blocks each, one of ordinary skill in the art will realize that the disks contain a significantly higher number of blocks.

In the embodiment of FIG. 2, a data file large enough to fill six blocks is stored. Consequently, the data file is comprised of six data blocks, data blocks zero through five. Although the data file depicted in FIG. 2 is comprised of only six blocks, one of ordinary skill in the art will recognize that a data file being stored could have a different number of blocks. Data block zero is stored in the first block 112 of disk zero 62. Data block one is stored in the complementary position in disk one 72, the last block in the inner track of disk one 72, block 228. Data block two is stored in the second block 114 of disk zero 62. Data block three is stored in the complementary position in disk one 72, the next to last block in the inner track, block 226. Data blocks four and five are similarly stored in complementary positions in disk zero 62, block 116 and disk one 72, block 224.

Figure 3:
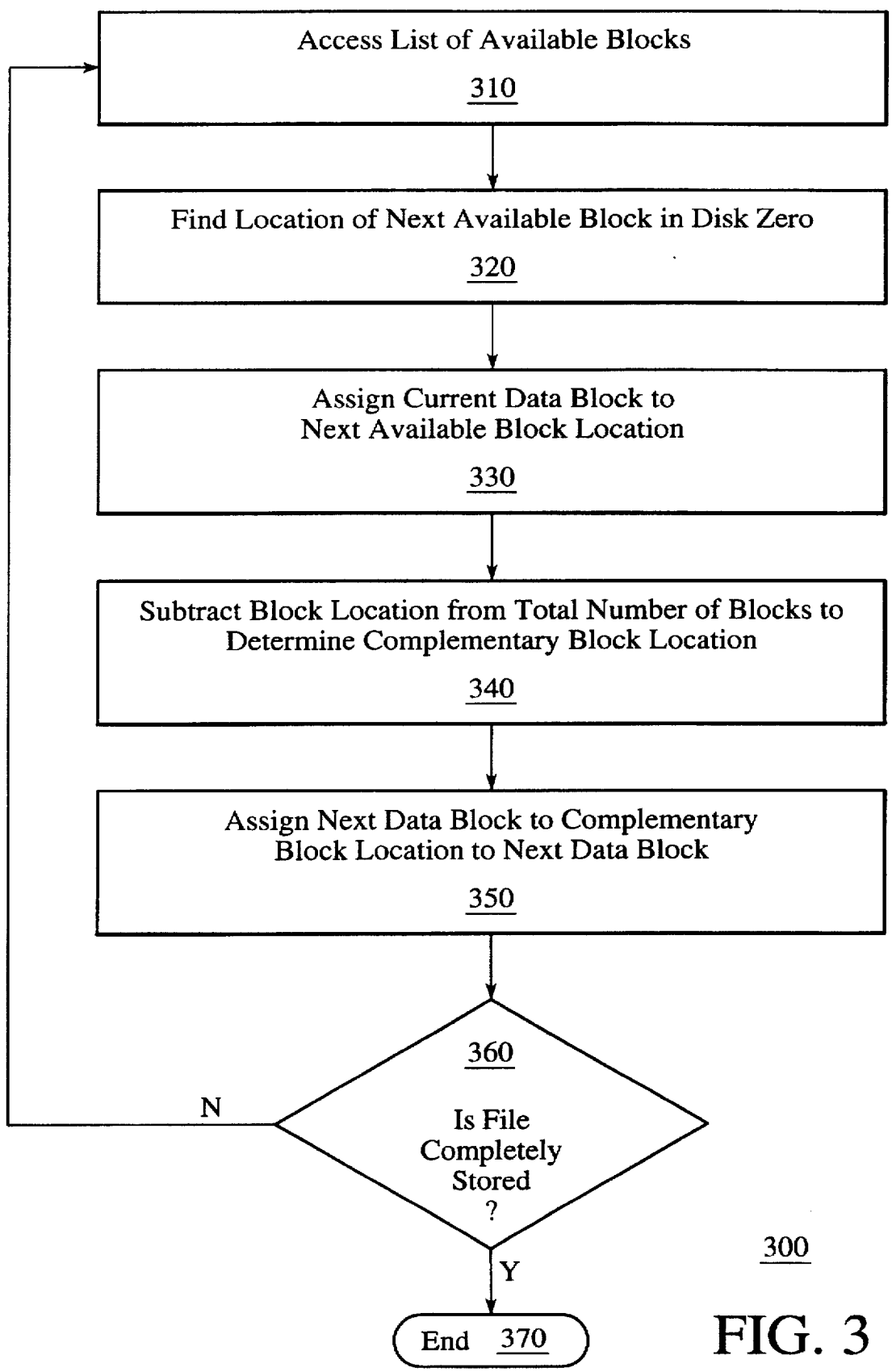
FIG. 3 is simplified flow chart depicting one embodiment of the method in accordance with the present invention.

In one embodiment, the cache manager 40 determines how a file comprising more than one block of data is stored. FIG. 3 depicts a simplified flow chart 300 of how the cache manager 40 assigns data to specific blocks in disks zero 62 and disk one 72. Referring now to FIG. 3, the cache manager 40 accesses the list of available blocks maintained by the cache manager 40 via step 310. The address of the next available block in disk zero 62 is determined from the list via step 320. The first block of data, data block zero, can then be assigned to the next available block in disk zero 62 via step 330. Once the next available block in disk zero 62 had been determined, the cache manager 40 computes the address of the complementary block via step 340. In the embodiment shown in FIG. 3, the method computes the address of the complementary block by taking the total number of blocks in a disk and subtracting the address obtained in step 320 to obtain the address of the complementary block. The second block of data can then be assigned to the complementary block in disk one 72 using step 350. In the embodiment shown in FIG. 3, the method determines if the data file has been completely stored in step 360. If the file has not been completely stored, steps 310 through 350 are repeated. If the file has been completely stored, the storage routine ends via step 370.

In order to deliver a stored file, cache manager 40 accesses the block list for the file that has been requested. Disk manager 50 then finds the blocks where the file is located on disk pairs disk zero 62 and disk one 72 or disk two 64 and disk three 74. The blocks are then read and transmitted in the order on the list to ensure accurate delivery of the file. Referring back to FIG. 2, the data in blocks 112, 228, 114, 226, 116, and 224 may be read in order when the data file is delivered.

Because the data blocks are stored in complementary positions on the two disks and the data file is a continuous media data file being read in order, the time to read the data file is an average of the time to read two complementary blocks. This time is an average of the time to read a block at an outer track and a block at an inner track. The transfer rate is, therefore, a combination of the minimum and maximum transfer rates of each disk. Consequently, for disks having a data transfer rate of four MB/sec at the outer track and three MB/sec at the inner track, the method and system has a constant transfer rate of approximately 3.5 MB/sec. Although the maximum transfer rate is now 3.5 MB/sec rather than four MB/sec, the minimum transfer rate is also 3.5 MB/sec rather than three MB/sec. This is an increase in the minimum transfer rate of approximately 17% over conventional systems.

Because of the minimum transfer rate is increased, NVFS 10 may take into account a higher data transfer rate when allocating the bandwidth for data transfers. Thus, NVFS 10 may be capable of delivering a larger number of data files at one time and serving a larger number of customers. In addition, the NVFS 10 may have a constant available bandwidth. NVFS 10 may, therefore, no longer be limited by the minimum transfer rate of an individual disk. Consequently, the ability of NVFS 10 to provide real time delivery of continuous media data files to a larger number of users is enhanced.

Note that the present invention can be combined with U.S. patent application Ser. No. 08/700,614, entitled "BLOCK SIZING FOR MULTIPLE USER CONTINUOUS MEDIA DATA SYSTEM," which provides a larger disk block size, and U.S. patent application Ser. No. 08/654,432, entitled "DATA STRIPING FOR INCREASED BUS UTILIZATION," which allows data to be transferred from two disks rapidly across a bus. If the method and system are combined with the inventions of the above patent applications, real time delivery of continuous media data streams to a large number of users is made more feasible.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for storage and delivery of a plurality of data files comprising:

a first disk and a second disk for storing the plurality of data files, the first disk and the second disk each further comprising a plurality of blocks;

means coupled to the first and second disks for dividing each of the plurality of data files into at least one data block, at least one of the plurality of data files being divided into a plurality of data blocks having an order, the at least one data file being stored by storing the plurality of blocks in order alternatively in the first and second disks in a portion of the plurality of blocks, each data block stored in the second disk being located in a block of the portion of the plurality of blocks occupying a complementary location on the second disk to a block of the portion of the plurality of blocks on the first disk in which a prior data block in the order is stored; and means coupled to the first and second disks for transferring each of the plurality of data files from the first and second disks, the means for transferring further comprising:

means coupled to the first disk and the second disk for performing a seek operation, the first and second disks being read alternatively to read the plurality of data blocks in order, at least a portion of the seek operation being performed on the second disk to find a next block on the second disk while a read and data transfer is performed for a current block on the first disk, and at least the portion of the seek operation being performed on the first disk to find a next block on the first disk while a read and transfer is performed on a current block of the second disk.

2. The system of claim 1 wherein the transfer rate from the block on the first disk and the block occupying the complementary location on the second disk is an average of the maximum and minimum transfer rates of each disk.

3. The system of claims 2 wherein the means for transferring further comprise:

a bus coupled to the first disk and the second disk for transferring data to or from the first and second disks, the bus being utilized more often during delivery of the at least one data file than the bus would be utilized by only the first disk alone or the second disk alone.

4. The system of claim 3 wherein the seek operation requires a seek time for completion; and wherein each of the plurality of blocks further comprises a disk block size, the disk block size being determined such that the seek time is less than or equal to a time required to read and transfer a data block.

5. The system of claim 4 wherein the plurality of data blocks further comprise even data blocks and odd data blocks, the even data blocks being stored in the first disk and the odd data blocks being stored in the second disk.

6. The system of claim 5 wherein the system is capable of delivering each of the plurality of data files to each of a predetermined number of users.

7. The system of claim 6 wherein each of the plurality of blocks has a disk block size, the system further comprising a cache manager coupled to the first disk and to the second disk, the cache manager for determining the disk block size.

8. The system of claim 7 wherein the cache manager further provides at least one block list, the at least one block list corresponding to the at least one data file, the at least one block list specifying a block in which each of the plurality of data blocks is stored and the order of the plurality of data blocks;

the system further comprising a disk manager coupled to the at least one disk and the cache manager, the disk manager for allowing delivery of the plurality of data blocks in the order specified by the block list.

9. The system of claim 8 further comprising a data file manager coupled to the cache manager, the data file manager for providing the predetermined number of users with information relating to each data file and for allowing each user to select each data file for delivery.

10. The system of claim 9 further comprising a user request manager coupled to the data file manager, the user request manager for arbitrating each user's access to the plurality of data files.

11. A system for storage and delivery of a plurality of data files comprising:

a plurality of disks, each of the plurality of disks further comprising a plurality of blocks for storing the plurality of data files;

means coupled to the plurality of disks for dividing each of the plurality of data files into at least one data block, at least one of the plurality of data files being divided into a plurality of data blocks, the plurality of data blocks having an order, the plurality of data blocks being stored in a portion of the plurality of blocks in order alternatively in the plurality disks, each data block being stored in a block of the portion of the plurality of blocks occupying a complementary location on a disk to a block of the portion of the plurality of blocks on another disk in which a prior data block in the order is stored; and means coupled to the plurality of disks for transferring each of the plurality of data files from the plurality of disks, the means for transferring further comprising:

means coupled to each of the plurality of disks for performing a seek operation, the plurality of disks being read alternatively to read the plurality of data blocks in order, at least a portion of the seek operation being performed on one of the plurality of disks to find a next block on the one of the plurality of disks while a read and data transfer is performed for a current block on a second disk of the plurality of disks.

12. The system of claim 11 wherein the transfer rate from the block on the disk and the block occupying the complementary location on another disk is an average of the maximum and minimum transfer rates of each disk.

13. The system of claim 12 wherein the means for transferring further comprise:

a bus coupled to each of the plurality of disks for transferring data to or from each of the plurality of disks, each of the plurality of disks being read in order, the bus being utilized more often during delivery of the at lest one data file than the bus would be utilized by only one of the plurality of disks alone.

14. The system of claim 13 wherein the seek operation requires a seek time for completion; and wherein each of the plurality of blocks further comprises a disk block size, the disk block size being determined such that the seek time is less than or equal to a time required to read and transfer a data block.

15. The system of claim 14 further being capable of providing each of the plurality of data files to a predetermined number of users.

16. A method for storage and delivery of a plurality of data files comprising the steps of:

(a) dividing each of the plurality of data files into at lest one data block, at least one data file of the plurality of data files being divided into a plurality of data blocks;

(b) storing the at least one data file in a first disk and a second disk, the first disk and the second disk further comprising a plurality of blocks, the storing step further comprising the steps of:

(b1) storing a data block of the plurality of data blocks in a next available block of the first disk, (b2) determining a complementary block on the second disk, the complementary block on the second disk being complementary to the next available block on the first disk, (b3) storing a next data block of the plurality of data blocks in the complementary block on the second disk, and (b4) repeating steps (b1) through (b3) until the at least one data file is completely stored;

(c) allowing a user to select any data file of the plurality of data files for delivery; and (d) transferring the selected data file to the user, the data transferring step further comprising the steps of:

(d1) performing a seek operation on the second disk to find a next block on the second disk while a read and data transfer is performed for a current block on the first disk; and (d2) performing a seek operation on the first disk to find a next block on the first disk while a read and data transfer is performed for a current block on the first disk.

17. The method of claim 16 wherein the complementary block determining step (b2) further comprises the steps of:

subtracting a location of the next available block in the first disk from a total number of blocks in the second disk.

18. The method of claim 17 wherein data transferring step (d) further comprises the step of:

(d3) transferring the selected data file to the user over a bus, the bus being utilized more often during delivery of the at least one data file than the bus would be utilized by only the first disk alone or the second disk alone.

19. The system of claim 18 wherein the seek operation requires a seek time for completion; and wherein the disk block size is such that the seek time is less than or equal to a time required to read and transfer a data block.

20. The system of claim 19 wherein the bus is utilized substantially all of the time that the at least one data file is being read.

21. A method for storage and delivery of a plurality of data files comprising the steps of:

(a) dividing each of the plurality of data files into at least one data block, at least one data file of the plurality of data files being divided into a plurality of data blocks;

(b) storing the at least one data file by storing the plurality of data blocks in a plurality of disks, each of the plurality of disks further comprising a plurality of blocks having a disk block size, the storing step further comprising the steps of:

(b1) storing a data block of the plurality of data blocks in a next available block of one disk of the plurality of disks, (b2) determining a complementary block on a next disk of the plurality of disks, the complementary block on the next disk being complementary to the next available block of the one disk;

(b3) storing a next data block of the plurality of data blocks in the complementary block on the next disk of the plurality of disks, (b4) repeating steps (b2) through (b3) for each of the plurality of disks, and (b5) repeating steps (b1) through (b4) until the at least one data file is completely stored;

(c) allowing each user to select any data file of the plurality of data files for delivery; and (d) transferring the selected data file from the plurality of disks, the step of transferring the selected data file further comprising the steps of:

(d1) performing a seek operation on one disk of the plurality of disks to find a next block on the one disk while a read and data transfer is performed for a current block on another disk of the plurality of disks.

22. The method of claim 21 wherein the complementary block determining step (b2) further comprises the step of:

subtracting a location of the next available block in the first disk from a total number of blocks in the second disk.

23. The method of claim 22 wherein data file transferring step (d) further comprises the steps of:

(d2) transferring the selected data file to the user over a bus, the bus being utilized more often during delivery of the at least one data file than the bus would be utilized by only one of the plurality of disks alone.

* * * * *

UNITED STATES PATENT AND TRADEMARK OFFICE
CERTIFICATE OF CORRECTION

PATENT NO. : 5,737,577
DATED : April 7, 1998
INVENTOR(S) : Martini

It is certified that error appears in the above-identified patent and that said Letters Patent is hereby corrected as shown below:

Title page, item [54] and col. 1, line 2, the Title should read as follow:
-- COMPLEMENTARY BLOCK STORAGE FOR GREATER MINIMUM DATA TRANSFER RATE --

Signed and Sealed this

Second Day of June, 1998

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,737,577
DATED : April 7, 1998
INVENTOR(S) : Edward W. Martini

It is certified that error appears in the above-identified patent and that said Letters Patent is hereby corrected as shown below:

On the title page, item [56] please add:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 6 | 2 | 3 | 0 | 2 | 2 | 11/23/71 | Day | | | |
| | | 4 | 2 | 4 | 1 | 4 | 1 | 1 | 12/23/80 | Krasner et al. | | | |
| | | | | | | | | | | | | | |

Signed and Sealed this

Fourth Day of May, 1999

Attest:

Attesting Officer

Q. TODD DICKINSON

Acting Commissioner of Patents and Trademarks